(12) United States Patent
Macaire

(10) Patent No.: US 7,548,001 B2
(45) Date of Patent: Jun. 16, 2009

(54) GEAR MOTOR IN PARTICULAR FOR MOTOR VEHICLE WIPER MECHANISM

(75) Inventor: Franck Macaire, Antony (FR)

(73) Assignee: Valeo Systemes d'Essuyage, La Verriere (FR)

( * ) Notice: Subject to any disclaimer, the term of this patent is extended or adjusted under 35 U.S.C. 154(b) by 225 days.

(21) Appl. No.: 10/588,400

(22) PCT Filed: Feb. 2, 2005

(86) PCT No.: PCT/EP2005/001026

§ 371 (c)(1),
(2), (4) Date: May 15, 2007

(87) PCT Pub. No.: WO2005/075266

PCT Pub. Date: Aug. 18, 2005

(65) Prior Publication Data

US 2007/0278873 A1 Dec. 6, 2007

(30) Foreign Application Priority Data

Feb. 6, 2004 (FR) .................................. 04 01195

(51) Int. Cl.
*H02K 11/00* (2006.01)
(52) U.S. Cl. ............................... 310/71; 310/83; 310/89
(58) Field of Classification Search .................... 310/71, 310/83, 89, 68 R, 99
See application file for complete search history.

(56) References Cited

U.S. PATENT DOCUMENTS

| 5,218,255 | A | 6/1993 | Horiguchi | |
|---|---|---|---|---|
| 5,777,410 | A * | 7/1998 | Asakura et al. | 310/71 |
| 5,864,188 | A | 1/1999 | Gerrand et al. | |
| 6,249,068 | B1 * | 6/2001 | Knopp | 310/71 |
| 6,528,915 | B1 * | 3/2003 | Moskob | 310/71 |
| 6,924,573 | B2 * | 8/2005 | Kitoh et al. | 310/89 |
| 2003/0109149 | A1 | 6/2003 | Abadia et al. | |
| 2004/0212263 | A1 * | 10/2004 | Kitoh et al. | 310/99 |
| 2006/0043803 | A1 * | 3/2006 | Yagi | 310/68 B |
| 2006/0163958 | A1 * | 7/2006 | Yagi et al. | 310/71 |

FOREIGN PATENT DOCUMENTS

| DE | 200 04 338 | 7/2001 |
|---|---|---|
| FR | 2 841 702 | 1/2004 |

OTHER PUBLICATIONS

International Search Report for PCT/EP2005/001026 dated Apr. 20, 2005 (2 pages).

* cited by examiner

*Primary Examiner*—Thanh Lam
(74) *Attorney, Agent, or Firm*—Osha • Liang LLP

(57) ABSTRACT

The invention is remarkable in that the connection the connection comprise at least one conductor track which is over-molded inside the closure casing, and which is provided with at least one notch suitable for co-operating by interfitting with a connection plug of one of the electrical components of the motor and gearbox unit, the track portions longitudinally defining each notch being suitable for exerting contact pressure by elastic deformation onto respective faces of the associated connection plug.

26 Claims, 5 Drawing Sheets

GEAR MOTOR IN PARTICULAR FOR MOTOR VEHICLE WIPER MECHANISM

The present invention relates to a motor and gearbox unit, i.e. to a device essentially made up of an electric motor which is coupled to a gearbox that serves to reduce the speed of said motor.

The invention is applicable particularly advantageously though not exclusively to the field of windshield wiper mechanisms for motor vehicles.

Motor and gearbox units have a variety of numbers of electrical components. In addition to the essential electrical motor and power supply connector, such a motor and gearbox unit usually also includes an electronic card making it possible to manage operation of the motor and gearbox unit precisely, one or more position and/or speed sensors, etc. It should be noted that, throughout this text, the concept of "electrical component" concerns both electrical devices in the strict sense of the term, and also electronic devices that are considered merely to be systems that are more advanced technically.

In any event, it is known that the various electrical components of a motor and gearbox unit can be electrically interconnected by soldering conductor wires and/or conductor tracks between their respective connection terminals. However, that solution is currently and gradually tending to disappear today, essentially because it is not ecological since it uses heavy metals that are particularly harmful for the environment.

In order to remedy that difficulty, it is now common to use connection boxes which are generally removable and in which conductor tracks are connected together, the ends of those tracks being suitable for coming to be assembled reversibly to the connection terminals of the various electrical components of the motor and gearbox unit.

Unfortunately, that type of connection set suffers from the drawback of having high cost because it requires, above all, the presence of an additional part that is also relatively voluminous, namely the connection box.

It also requires tracks of complex shapes and/or special connectors at the zones of connection between conductor tracks and connection terminals, in order to be able to achieve the reversible engagement function inherent to the removable characteristic of the box. Thus, when the ends of the conductor tracks are in the form of plugs, the use of costly and voluminous sockets then becomes obligatory. Conversely, when it is the connection terminals of the electrical components that are constituted by plugs, the ends of the conductor tracks are generally folded into lyre shapes, which requires numerous folding operations and/or cutting-out operations which are always complicated to implement.

Thus, the technical problem to be solved by the present invention is to propose a motor and gearbox unit in particular for a motor vehicle windshield wiper mechanism, said motor and gearbox unit comprising a support casing on which an electric motor coupled to a gearbox is mounted, a closure casing covering the support casing, and connection means electrically interconnecting the various electrical components of the motor and gearbox unit, which motor and gearbox unit makes it possible to avoid the problems of the state of the art by offering a connection set that is significantly less costly, while also having good connection quality.

The solution to the technical problem posed consists, in accordance with the present invention, in that the connection means comprise at least one conductor track which is overmolded inside the closure casing, and which is provided with at least one notch suitable for co-operating by interfitting with a connection plug of one of the electrical components of the motor and gearbox unit, the track portions longitudinally defining each notch being suitable for exerting contact pressure by elastic deformation onto respective faces of the associated connection plug.

The invention as defined offers the advantage of proposing connection means that, from a structural point of view, are considerably simpler than their state-of-the-art counterparts, and therefore are considerably less expensive to implement.

Overmolding conductor tracks inside the closure casing makes it possible to omit the additional part constituted by the connection box. It also makes it possible to adopt conductor track profiles that are relatively linear, and thus easy to manufacture and to integrate Naturally, all this assumes that the closure casing is made of an electrically insulating material, e.g. of plastic.

The interfitting principle used for interconnecting each connection plug and the conductor track that is associated with it does not require any special connector, or any complex folding or cutting-out operations. This further contributes to reducing the cost of the connection means.

Overmolding also makes it possible to procure much greater precision in the relative positioning of the conductor tracks relative to the connection plugs of the various electrical components of the motor and gearbox unit, for the benefit of an improved connection quality.

The precision inherent to the interfitting principle used for implementing the connections also participates in obtaining significantly improved rigor in assembling together conductor tracks and connection plugs.

It should be noted that, in addition to making the conductor tracks particularly easy to overmold, the formal simplicity of said conductor tracks also makes it possible, particularly advantageously, not to complicate or to prevent unmolding of the closure casing once said conductor tracks have been integrated into the molding.

The present invention also provides the characteristics that appear from the following description and that should be considered in isolation or in any technically feasible combination.

This description, given by way of non-limiting example, imparts a clearer understanding of how the invention can be implemented, the description being given with reference to the accompanying drawings, in which:

For reasons of clarity, like elements are designated by identical references. Similarly, only those elements which are essential for understanding the invention are shown, without being drawn to scale and in diagrammatic manner.

FIG. 1 shows a motor and gearbox unit 1 which is designed to equip a motor vehicle windshield wiper device. Since this type of appliance is well known, operation of it is not described in detail below.

Figure 1:
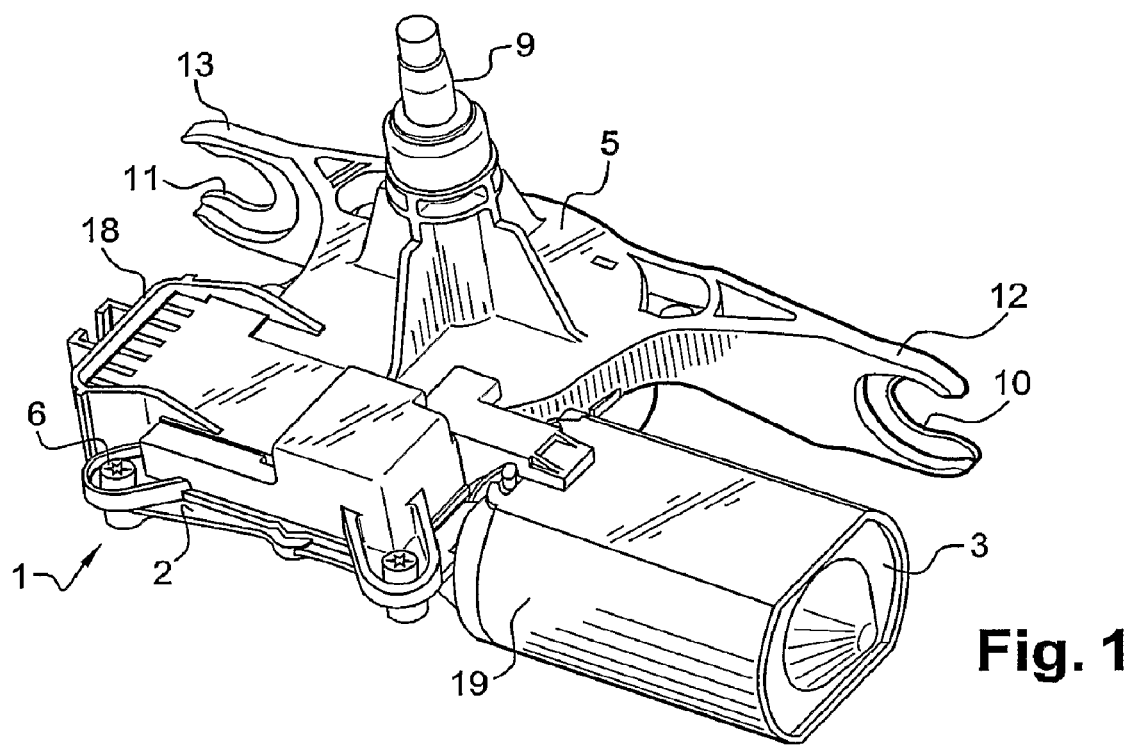
FIG. 1 is a perspective view of a motor and gearbox unit of the invention.

From a purely structural point of view, the motor and gearbox unit 1 conventionally has a support casing 2 on which an electric motor 3 coupled to a gearbox 4 serving to reduce the speed of said motor is mounted The support casing 2 is covered by a closure casing 5 to which it is secured by means of a plurality of assembly screws 6.

Figure 2:
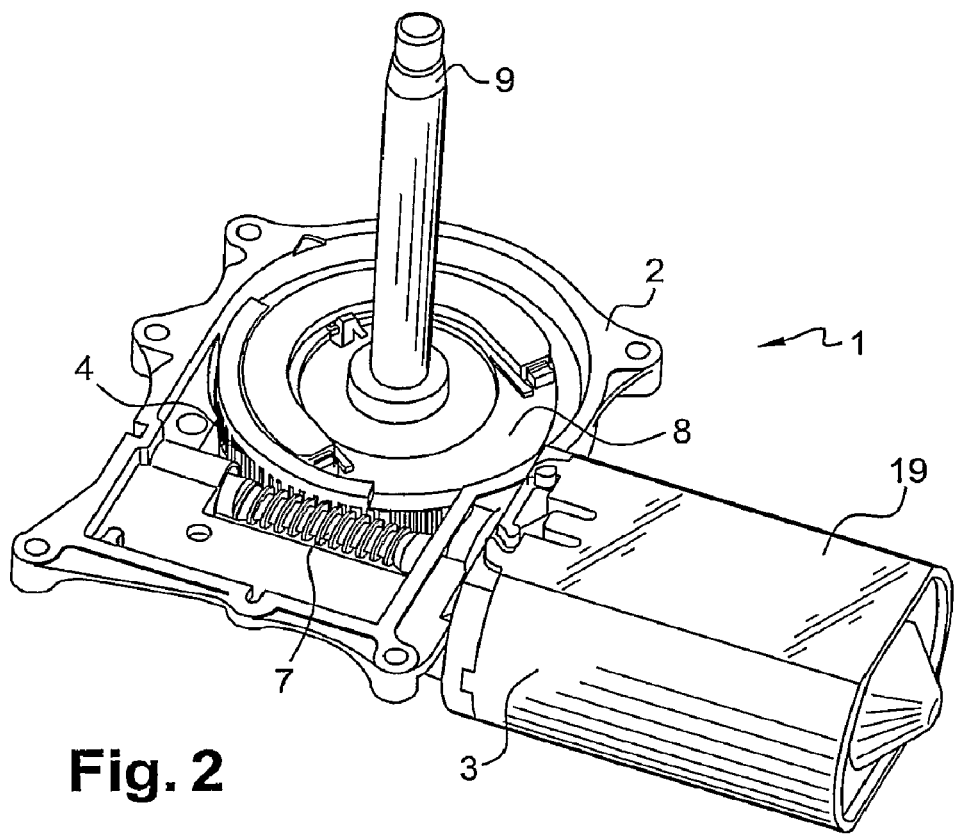
FIG. 2 shows the motor and gearbox unit without its closure casing.

Although it also serves as an anchor base for anchoring the electric motor 3, the support casing 2 is above all designed to support all of the internal components of the gearbox 4, as can be seen in FIG. 2. It is possible to observe, in particular, the presence of a worm screw 7 which is suitable for being driven in axial rotation directly by the electric motor 3, and the presence of a toothed wheel 8 that is secured to an output shaft 9 mounted to move in rotation about an axis that is substantially perpendicular to the axis of rotation of the worm screw 7. The entire assembly is arranged so that the worm screw 7 co-operates by meshing with the toothed wheel 8, so that the output shaft 9 is capable of being driven indirectly in axial rotation by the electric motor 3.

Figure 3:
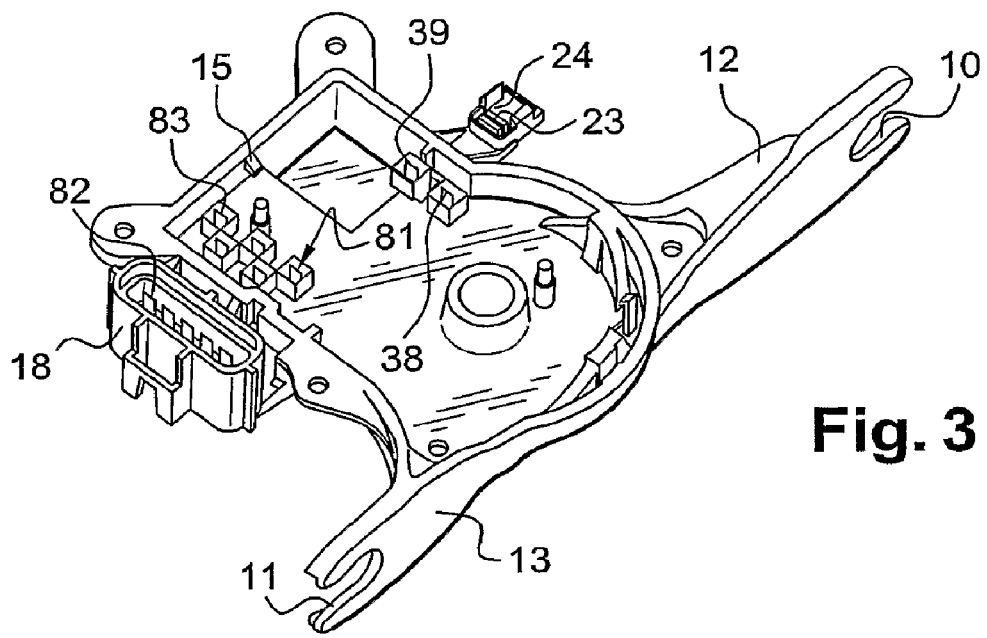
FIG. 3 is a view from below of the closure casing of the motor and gearbox unit.

In addition to acting as a protective element, the closure casing 5 shown in FIG. 3 also serves as a support for fastening the motor and gearbox unit 1 to the bodywork of the motor vehicle. To this end, two recesses 10, 11 are provided in two distinct tabs 12, 13 in order to receive conventional fastening dampers (not shown herein for obvious reasons of clarity).

In this particular embodiment, chosen merely by way of example, the motor and gearbox unit 1 is provided with an electronic card 14 which, in particular, serves to manage the current between its various electrical components.

Figure 4:
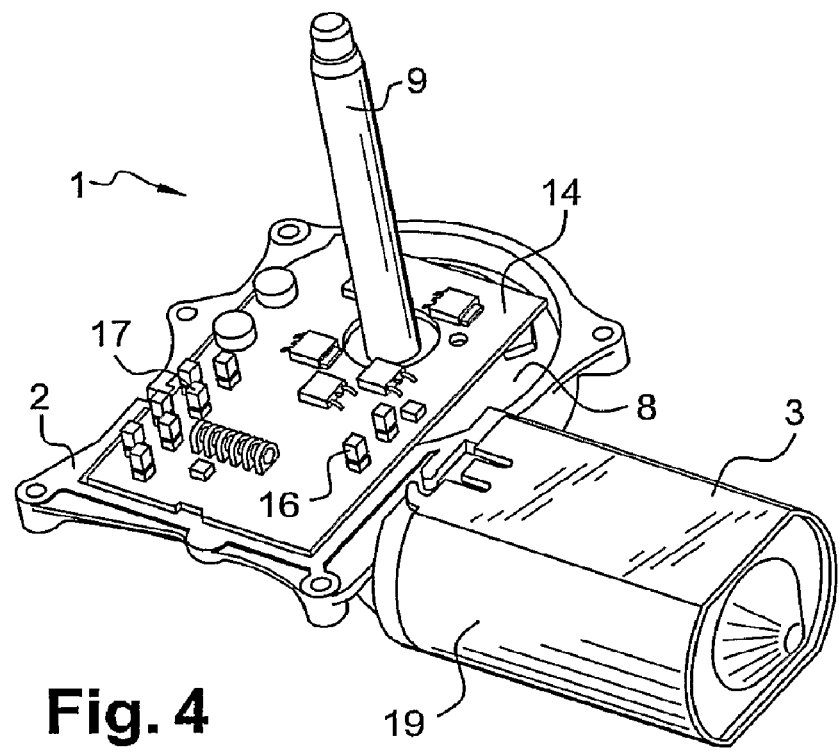
FIG. 4 is a view similar to the FIG. 2 view, but also showing the electronic card of the motor and gearbox unit.

FIG. 4 shows the positioning of said electronic card 14 relative to the support casing 2, although in practice it is generally secured removably inside the closure casing 5, by means of an elastically deformable blocking element 15. The object of showing it in this way is essentially to show the connection terminals 16, 17 of the electronic card 14, which terminals are all sockets in this example.

FIG. 3 also shows that the motor and gearbox unit 1 is provided with a connector 18 that serves to connect the various electrical components to an external power and/or control source. Particularly advantageously, said electrical connector 18 is, in this example, overmolded directly inside the closure casing 5, which is advantageously made of electrically insulating plastic.

As can be seen partially in FIG. 3, the motor and gearbox unit 1 also has connection means 20 that are suitable for electrically interconnecting the various electrical components of the motor and gearbox unit 1, i.e., in the present example, the connector 18, the electronic card 14, and the electric motor 3.

Figure 5:
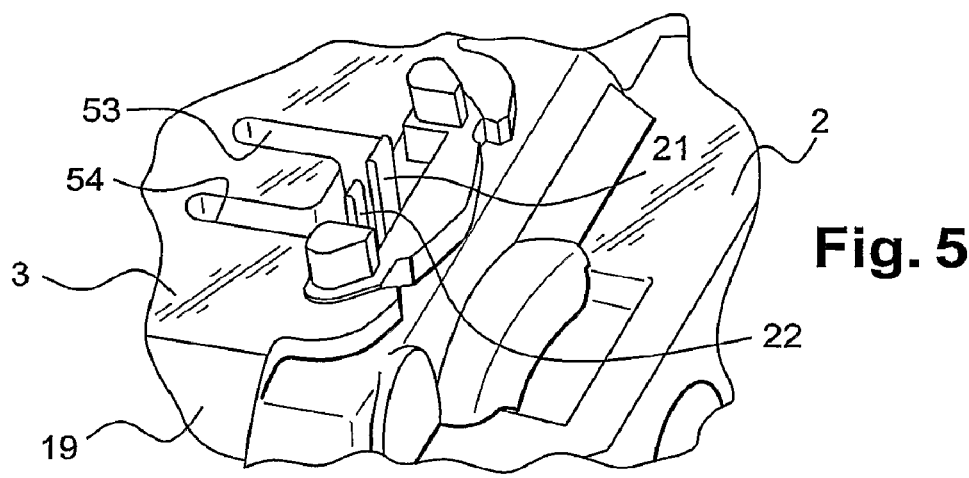
FIG. 5 shows in detail that portion of the motor and gearbox unit in which the connection plugs of the electric motor are located.

As shown in FIG. 5, the electric motor 3 is provided with two connection plugs 21, 22, forming power supply terminals. Said power supply terminals project more particularly from the side of the closure casing 5, at the join plane situated between the housing 19 of the electric motor 3 and support casing 2. Said terminals are thus accessible from the top portion of the motor and gearbox unit 1.

In accordance with the present invention, the connection means 20 of this particular embodiment comprise two conductor tracks 23, 24 which are overmolded in the closure casing 5, and which are each provided with a notch 25, 26 suitable for co-operating by interfitting with one of the connection plugs 21, 22 of the electric motor 3. In addition, the track portions 27a, 27b, 28a, 28b longitudinally defining each notch 25, 26 are suitable for exerting contact pressure by elastic deformation on respective faces of the associated connection plug 21, 22.

Figure 6:
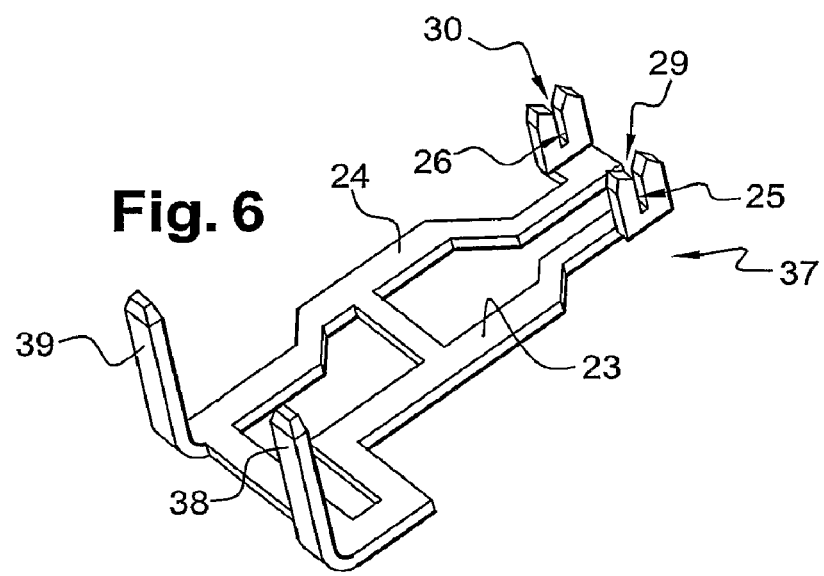
FIG. 6 is a perspective view of an insert designed to constitute the conductor tracks serving for electrically interconnecting the electronic card and the electric motor.

FIG. 6 also shows a first insert 37 made of a conductive material, which insert is designed to be integrated by overmolding into the insulating material of the closure casing 5, so that, once it is cut out, it constitutes the future conductor tracks 23, 24 that are shown in part in FIG. 3. It can be observed that the ends 38, 39 have conventional single-plug shapes because they are designed to fit into the sockets 16 of the electronic card 14.

Figure 7:
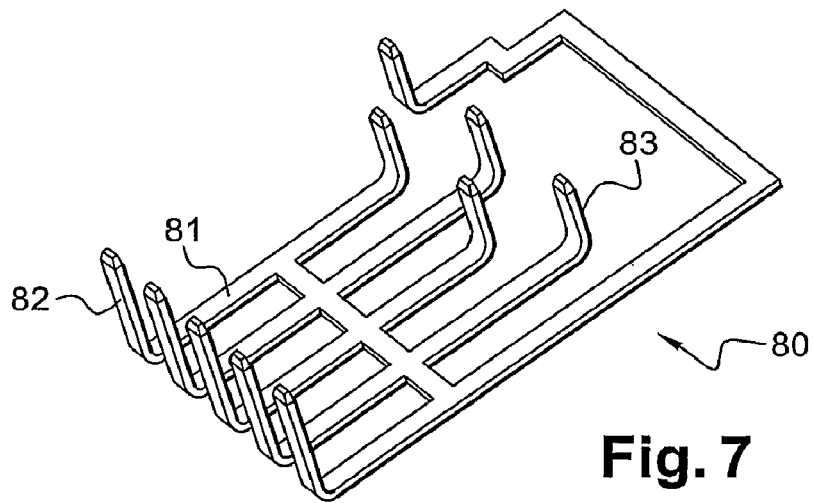
FIG. 7 is a perspective view of an insert designed to constitute the conductor tracks serving for electrically interconnecting the electrical connector and the electronic card.

By way of comparison, FIG. 7 shows a second insert 80 made of a conductive material, which insert is also designed to be integrated by overmolding into the insulating material of the closure casing 5. But the aim here is to constitute the future conductor tracks 81 that serve for electrically connecting the connector 18, via the ends 82, to the sockets 17 of the electronic card 14, via the ends 83.

In a feature of the invention, the minimum width of each notch 25, 26 is significantly less than the thickness of the associated connection plug 21, 22. Combined with the intrinsic resilience of the material of which each conductor track 23, 24 is made, this characteristic makes it possible to generate the pressure necessary to guarantee that contact is established between each track portion 27a, 27b, 28a, 28b and the respective face of the corresponding connection plug 21, 22.

Figure 8:
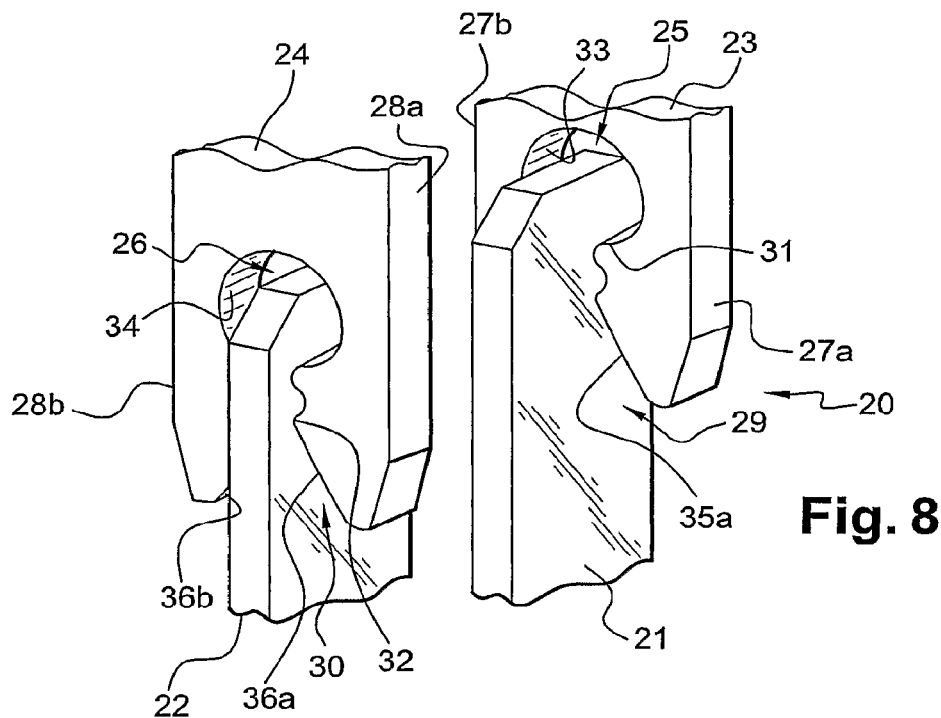
FIG. 8 shows the zones of contact between the connection plugs of the electric motor and their power supply conductor tracks.

As shown in FIG. 8, each notch 25, 26 is provided through the conductor track 23, 24 substantially perpendicularly to the faces of said conductor track. Each notch 25, 26 is also provided with a "side" opening 29, 30 which opens out in the side edge of the conductor track 23, 24. This characteristic means that the interfitting engagement between each connection plug 21, 22 and its notch 25, 26 takes place in substantially orthogonal planes.

In this embodiment, each notch 25, 26 is also provided longitudinally at one end of the conductor track 23, 24, and its side opening 29, 30 opens out at the portion that is further or more distal from said track end.

As can also be seen in FIG. 8, the wall defining each notch 25, 26 is provided with four convex portions 31, 32 which are suitable for co-operating by contact with the associated connection plug 21, 22. In other words, this means that the cross-section of each notch 25, 26 is not constant, and that projecting portions of wall exist that are capable of guaranteeing that contact is established with the corresponding face of the associated connection plug 21, 22, even if said contact is only local.

It is also observed that the wall portion defining the end-wall 33, 34 of each notch 25, 26 presents a profile that is rounded, and preferably that is substantially circular. This characteristic makes it possible to increase the tear strength of each conductor track 23, 24 in a zone in which the mechanical tensions can become relatively high. This applies precisely when the track portions 27a, 27b, 28a, 28b move apart on inserting a connection plug 21, 22 into the corresponding notch 25, 26.

It is also observed that each wall portion defining the side opening 29, 30 inside a notch 25, 26 is provided with a bevel 35a, 35b, 36a, 36b making it possible to facilitate insertion of the associated connection plug 21, 22. Finally, each notch 25, 26 is substantially keyhole-shaped.

Figure 9:
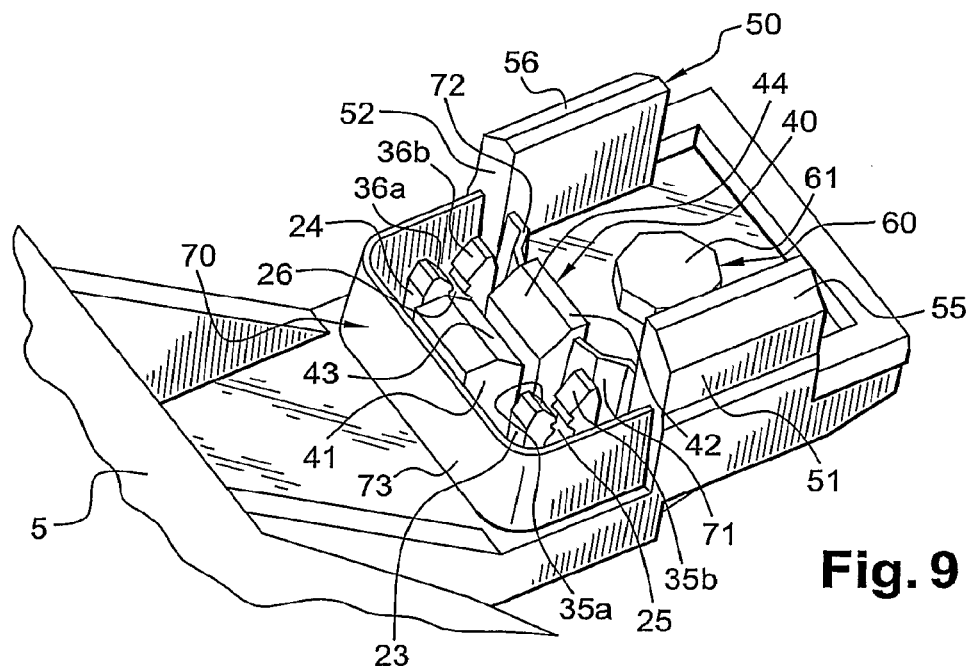
FIG. 9 shows in detail that portion of the closure casing which supports the ends of the conductor tracks that serve to power the electric motor.

As shown in FIG. 9, the motor and gearbox unit 1 has guide means 40 which are suitable for guiding the engagement of each connection plug 21, 22 into the corresponding notch 25, 26 of the associated conductor track 23, 24. This characteristic makes it possible to guarantee effective connection when a connection plug 21, 22 and its notch 25, 26 are brought closer together, even if perfect co-linearity is not established.

Figure 10:
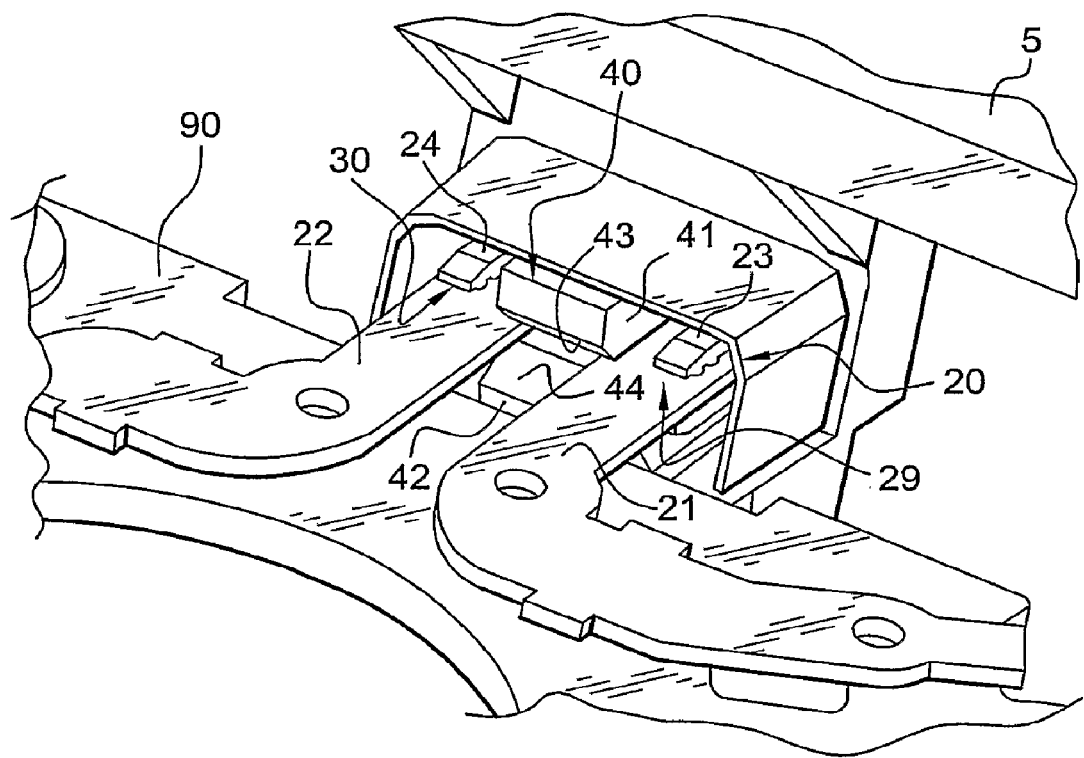
FIG. 10 shows the relative positioning of the connection plugs of the electric motor relative to that portion of the closure casing which is shown in FIG. 7.

In a feature of the invention, the guide means 40 of the same connection plug 21, 22 comprise two projecting elements 41, 42 that are integral with or secured to the closure casing 5. As shown in FIG. 10, each of said two projecting elements 41, 42 is also suitable for co-operating by sliding with an edge of a respective face of the connection plug 21, 22, simultaneously with said connection plug 21, 22 being engaged in the corresponding notch 25, 26 of the associated conductor track 23, 24.

As can be seen in FIGS. 9 and 10, the two guide elements 41, 42 for guiding the same connection plug 21, 22 are positioned facing each other, at a distance corresponding substantially to the thickness of said connection plug 21, 22, and in the vicinity of the corresponding notch 25, 26 of the associated conductor track 23, 24. The space lying between the two guide elements 41, 42 then extends facing the notch 25, 26 so that one of the longitudinal edges of the connection plug 21, 22 is suitable for being engaged therein during a connection. Each of the facing faces of the two guide elements 41, 42 is then suitable for co-operating by sliding contact with the inside edge of a respective face of the connection plug 21, 22.

Particularly advantageously, each guide element 41, 42 for guiding the same connection plug 21, 22 is provided in its distal portion with a bevel 43, 44 which is formed facing the other guide element 41, 42. Each of said bevels 43, 44 is also suitable for guiding insertion of a respective edge of the connection plug 21, 22 between said guide elements 41, 42, simultaneously with said connection plug 21, 22 being engaged axially into the corresponding notch 25, 26 of the associated conductor track 23, 24.

In this particular embodiment, the two guide elements 41, 42 are positioned between the two conductor tracks 23, 24, and are suitable for simultaneously guiding the engagements of the two connection plugs 21, 22 of the electric motor 3 into the notches 25, 26 that are respectively associated with them. This means that the two guide elements 41, 42 are simultaneously suitable for co-operating by sliding contact with both of the two connection plugs 21, 22.

FIG. 9 also shows that the motor and gearbox unit 1 is provided with positioning means 50 making it possible to position each notch 25, 26 of a conductor track 23, 24 facing the corresponding connection plug 21, 22 prior to engagement. Since it is mounted along the output shaft 9, the closure casing 5 can, a priori turn about that axis. It is thus important to position it angularly correctly before attempting to connect the conductor tracks 23, 24 to the connection plugs 21, 22, in order to be sure that connection problems are not encountered subsequently. This pre-positioning consists practically in disposing the notches 25, 26 vertically in register with but at some distance from the connection plugs 21, 22.

In a feature of the invention, the positioning means 50 are provided with at least one projecting element 51, 52 which is integral with or secured to the closure casing 5, and which is suitable for co-operating by interfitting with a slot 53, 54 of substantially complementary shape, provided in one of the other component elements of the motor and gearbox unit 1 (FIG. 5). Such an element can, for example, be the electric motor 3 or the support casing 2.

Particularly advantageously, each positioning element 51, 52 is provided with at least one bevel 55, 56 that is formed at its distal end and that is suitable for facilitating insertion of it into the corresponding slot 53, 54.

In this particular embodiment, the positioning means 50 comprise two positioning elements 51, 52 which are suitable for co-operating by interfitting with respective ones of two slots 53, 54 of substantially complementary shape, provided through the housing 19 of the electric motor 3.

FIG. 9 also shows that the motor and gearbox unit 1 is provided with abutment means 60 that are suitable for blocking insertion of each connection plug 21, 22 into the corresponding notch 25, 26 of the associated conductor track 23, 24, when the distal end of said connection pug 21, 22 reaches the vicinity of the end wall 33, 34 of said notch 25, 26. This characteristic makes it possible to limit the relative interfitting between the two portions of each connection, and thus to prevent the plug 21, 22 from coming into abutment against the end wall of the notch 25, 26. The object is to avoid any deformation that might give rise to a loss of electrical contact, regardless of whether said deformation occurs at the connection plug 21, 22 or at the notch 25, 26.

In a feature of the invention, the abutment means 60 comprise at least one projecting stud 61 that is integral with or secured to the closure casing 5, and that is suitable for co-operating by blocking contact with one of the component elements of the motor and gearbox unit, such as, for example, the electric motor 3 or the support casing 2.

In this particular embodiment, the abutment means 60 comprise a single stud 61 that projects between the two positioning elements 51, 52. Said stud 61 is also suitable for co-operating by blocking contact with that zone of the housing 19 of the electric motor 3 which is situated between the two slots 53, 54 serving to receive said positioning elements 51, 52.

FIG. 9 also shows that the motor and gearbox unit 1 is provided with insulation means 70 which are suitable for electrically insulating each connection constituted by a connection plug 21, 22 being fitted into a notch 25, 26 of a conductor track 23, 24 relative to the other conductive elements of the motor and gearbox unit 1, in particular the housing 19 of the electric motor 3. In any event, the aim of this characteristic is to prevent electric arcs from striking between each connection and its immediate or direct surrounding metal environment.

In a feature of the invention, the insulation means 70 have at least one electrically insulating wall 71, 72, 73 which is integral with or secured to the closure casing 5 and that forms a continuous screen around at least one conductor track portion 23, 24 provided with a notch 25, 26.

In this particular embodiment, the insulation means 70 comprise a first electrically insulating wall 71 which joins the positioning element 51 to the guide element 42, a second electrically insulating wall 72 which connects the same guide element 42 to the positioning element 52, and a third electrically insulating wall 73 which connects said positioning elements 51, 52 together while going around the two conductor track portions 23, 24 that are provided with respective ones of the two notches 25, 26.

Particularly advantageously, the insulation means are also suitable for protecting the structural integrity of each conductor track portion 23, 24 that is provided with a notch 25, 26.

As can be seen in the embodiment shown in FIG. 10, the connection plugs 21, 22 of the electric motor 3 are mounted on a support 90 made of Bakelite that is secured to the inside of the housing 19 and that can be referred to as a "carbon brush holder plate". It should be noted that a support made of plastic could be used in equivalent manner.

Naturally, the invention also relates to any windshield wiper device including at least one motor and gearbox unit 1 as described above. It should be noted that, in this type of application, a motor and gearbox unit of the invention can equip either a rear or a front windshield wiper device.

The invention can however be applied to fields other than wiping. Indeed the invention relates more generally to any motor vehicle equipped with at least one motor and gearbox unit as described above.

The invention claimed is:

1. A motor and gearbox unit in particular for a motor vehicle windshield wiper mechanism, said motor and gearbox unit comprising a support casing on which an electric motor coupled to a gearbox is mounted, a closure casing covering the support casing, and connection means electrically interconnecting the various electrical components of the motor and gearbox unit, said motor and gearbox unit being characterized in that the connection means comprise at least one conductor track which is overmolded inside the closure casing, and which is provided with at least one notch suitable for co-operating by interfitting with a connection plug of one of the electrical components of the motor and gearbox unit, the track portions longitudinally defining each notch being suitable for exerting contact pressure by elastic deformation onto respective faces of the associated connection plug.

2. A motor and gearbox unit according to claim 1, characterized in that the minimum width of each notch is significantly less than the thickness of the associated connection plug.

3. A motor and gearbox unit according to claim 1, characterized in that each notch is provided through the conductor track in a manner substantially perpendicular to the faces of said track, and is provided with a "side" opening that opens out in the side wall of said conductor track.

4. A motor and gearbox unit according to claim 1, characterized in that each notch is provided longitudinally at one end of the conductor track, and in that its side opening opens out in the portion that is further or distal from said track end.

5. A motor and gearbox unit according to claim 1, characterized in that the wall defining each notch has at least one convex portion suitable for co-operating by contact with the associated connection plug.

6. A motor and gearbox unit according to claim 1, characterized in that the wall portion that defines the end wall of the notch has a profile that is rounded, and preferably that is substantially circular.

7. A motor and gearbox unit according to any one of claim 1, characterized in that each wall portion defining the side opening inside a notch is provided with a bevel suitable for facilitating insertion of the associated connection plug.

8. A motor and gearbox unit according to claim 1, characterized in that it further comprises guide means suitable for guiding the engagement of each connection plug into the corresponding notch of the associated conductor track.

9. A motor and gearbox unit according to claim 8, characterized in that the guide means for guiding any one connection plug comprise two projecting elements which are integral with or secured to the closure casing and each of which is suitable for co-operating by sliding with an edge of a respective face of the connection plug, simultaneously with said connection plug being engaged axially into the corresponding notch in the associated conductor track.

10. A motor and gearbox unit according to claim 9, characterized in that the two guide elements for guiding any one connection plug are positioned facing each other, at a distance corresponding substantially to the thickness of said connection plug, and in the vicinity of the corresponding notch in the associated conductor track, the space between said guide elements extending facing said notch.

11. A motor and gearbox unit according to claim 9, characterized in that each guide element for guiding any one connection plug is provided in its distal portion with a bevel which is formed facing the other guide element and which is suitable for guiding insertion of an edge of the connection plug between said guide elements, simultaneously with the axial engagement of said connection plug in the corresponding notch in the associated conductor track.

12. A motor and gearbox unit according to claim 1, characterized in that it further comprises positioning means suitable for positioning each notch of a conductor track facing the corresponding connection plug prior to them being engaged in each other.

13. A motor and gearbox unit according to claim 12, characterized in that the positioning means comprise at least one projecting element which is integral with or secured to the closure casing, and which is suitable for co-operating by interfitting with a slot of substantially complementary shape that is provided in one of the other component elements of the motor and gearbox unit.

14. A motor and gearbox unit according to claim 13, characterized in that each positioning element is provided with at least one bevel which is formed in its distal end, and which is suitable for facilitating insertion of it into the corresponding slot.

15. A motor and gearbox unit according to claim 1, characterized in that it further comprises abutment means suitable for blocking insertion of each connection plug into the corresponding notch of the associated conductor track, when the distal end of said connection plug reaches the vicinity of the end-wall of said notch.

16. A motor and gearbox unit according to claim 15, characterized in that the abutment means comprise at least one projecting stud that is integral with or secured to the closure casing, and that is suitable for co-operating by blocking contact with one of the other component elements of the motor and gearbox unit.

17. A motor and gearbox unit according to claim 1, characterized in that it further comprises insulation means suitable for electrically insulating each connection constituted by engagement of a connection plug into a notch in a conductor track relative to the other conductive elements of the motor and gearbox unit.

18. A motor and gearbox unit according to claim 17, characterized in that the insulation means comprise at least one electrically insulating wall which is integral with or secured to the closure casing, and which forms a continuous screen around at least one portion of conductive track that is provided with a notch.

19. A motor and gearbox unit according to claim 17, characterized in that the insulation means are also suitable for protecting the structural integrity of each portion of conductor track that is provided with a notch.

20. A motor and gearbox unit according to claim 1, characterized in that the electric motor is provided with two connection plugs forming power supply terminals, and in that the connection means comprise two conductor tracks which are overmolded in the closure casing and each of which is provided with a notch suitable for co-operating by interfitting with one of said connection plugs.

21. A motor and gearbox unit according to claim 8, characterized in that the guide means comprise two guide elements which are positioned between the two conductor tracks, and which are suitable for simultaneously guiding the engagements of the two connection plugs of the electric motor into the notches in said tracks that are associated respectively with them.

22. A motor and gearbox unit according to claim 12, characterized in that the positioning means comprise two positioning elements which are suitable for co-operating by interfitting with respective ones of two slots of substantially complementary shapes that are provided through the housing of the electric motor.

23. A motor and gearbox unit according to claim 15, characterized in that the abutment means comprise a stud that projects between the two positioning elements and that is suitable for co-operating by blocking contact with that zone of the housing of the electric motor which is situated between the two slots serving to receive said positioning elements.

24. A motor and gearbox unit according to claim 1, characterized in that the closure casing is made of an electrically insulating material.

25. A windshield wiper device, characterized in that it includes at least one motor and gearbox unit according to claim 1.

26. A motor vehicle, characterized in that it includes at least one motor and gearbox unit according to claim 1.

* * * * *